United States Patent
Sotgiu (10) Patent No.: US 10,520,129 B2
(45) Date of Patent: Dec. 31, 2019

(54) MACHINE BODY FOR A WHEEL SERVICING APPARATUS WITH DISPLAY SUPPORT UNIT

(71) Applicant: Snap-on Equipment Srl a unico socio, Correggio (RE) (IT)

(72) Inventor: Paolo Sotgiu, Modena (IT)

(73) Assignee: SNAP-ON EQUIPMENT SRL A UNICO SOCIO, Correggio (IT)

( * ) Notice: Subject to any disclaimer, the term of this patent is extended or adjusted under 35 U.S.C. 154(b) by 305 days.

(21) Appl. No.: 15/202,201

(22) Filed: Jul. 5, 2016

(65) Prior Publication Data

US 2018/0014419 A1     Jan. 11, 2018

(51) Int. Cl.
  *F16M 11/18*      (2006.01)
  *G01M 1/04*       (2006.01)

(52) U.S. Cl.
  CPC ............ *F16M 11/18* (2013.01); *G01M 1/045* (2013.01)

(58) Field of Classification Search
  None
  See application file for complete search history.

(56) References Cited

U.S. PATENT DOCUMENTS

| | | | | |
|---|---|---|---|---|
| 3,675,495 A | * | 7/1972 | MacMillan | G01M 1/28 73/466 |
| 3,741,016 A | * | 6/1973 | Hofmann | G01B 7/02 73/462 |
| 3,785,211 A | * | 1/1974 | Branick | G01M 1/16 73/480 |
| 3,824,862 A | * | 7/1974 | Branick | G01M 1/02 73/480 |
| 4,381,548 A | * | 4/1983 | Grossman | G01B 7/315 33/288 |
| 5,109,715 A | * | 5/1992 | Christian | G01M 1/08 73/146 |
| 5,161,028 A | * | 11/1992 | Kawata | B60K 37/02 248/917 |
| 5,173,686 A | * | 12/1992 | Fujihara | G09F 9/35 248/920 |

(Continued)

FOREIGN PATENT DOCUMENTS

EP    2 163 873 A1    3/2010
EP    2 163 874 A1    3/2010

OTHER PUBLICATIONS

Extended European Search Report issued in European Patent Application No. 16001507.9, dated Mar. 22, 2017.

*Primary Examiner* — Timothy J Thompson
*Assistant Examiner* — Muhammed Azam
(74) *Attorney, Agent, or Firm* — Miles & Stockbridge P.C.; Michael A. Messina (57) ABSTRACT

A machine body for a wheel servicing apparatus includes a casing and a display support unit configured to support a display unit, such as a touchscreen unit, that is connectable with a processing unit of the wheel servicing apparatus. The display support unit is movably arranged at the casing to provide a first position in which a display front surface of the display unit attachable to the display support unit is visible to a user, and a second position in which a display front surface of the display unit attachable to the display support unit is shielded from the outside such that the display front surface is not visible to the user.

17 Claims, 6 Drawing Sheets

(56) References Cited

U.S. PATENT DOCUMENTS

| | | | | |
|---|---|---|---|---|
| 5,311,777 | A * | 5/1994 | Cunningham | G01M 1/02 248/279.1 |
| 5,401,089 | A * | 3/1995 | Inagaki | A47B 21/0073 312/306 |
| 5,471,874 | A * | 12/1995 | Rothamel | G01M 1/02 73/462 |
| 5,850,215 | A * | 12/1998 | Kamiya | G01C 21/26 345/204 |
| 6,142,590 | A * | 11/2000 | Harwell | G06F 1/16 312/208.1 |
| 6,168,250 | B1 * | 1/2001 | Rogov | A47B 21/0073 248/917 |
| 6,442,030 | B1 * | 8/2002 | Mammoser | G06F 1/1601 248/917 |
| 6,494,150 | B1 * | 12/2002 | Phoenix | A47B 51/00 108/147 |
| 6,612,670 | B2 * | 9/2003 | Liu | A47G 5/00 160/351 |
| 6,626,686 | B1 * | 9/2003 | D'Souza | A47B 21/0314 248/118.1 |
| 6,728,609 | B2 * | 4/2004 | Murray | G01B 11/275 356/138 |
| 6,732,585 | B1 * | 5/2004 | Cunningham | G01M 1/02 211/163 |
| 6,733,094 | B1 * | 5/2004 | Chang | A47B 21/0073 312/306 |
| 6,802,577 | B2 * | 10/2004 | Gershfeld | A47B 21/0073 108/50.01 |
| 6,827,409 | B2 * | 12/2004 | Michael | A47B 21/0073 248/920 |
| 6,913,332 | B1 * | 7/2005 | Besterfield | A47B 21/0073 108/50.01 |
| 6,956,735 | B2 * | 10/2005 | Lee | G06F 1/16 211/134 |
| 7,063,024 | B2 * | 6/2006 | Latino | A47B 21/0073 108/147 |
| 7,069,660 | B2 * | 7/2006 | Robb | G06T 7/70 33/203.16 |
| D555,148 | S * | 11/2007 | Mittersinker | D14/217 |
| 7,517,029 | B2 * | 4/2009 | Cvek | A47B 21/007 312/196 |
| 7,518,714 | B2 * | 4/2009 | Voeller | G01B 11/2755 356/139.09 |
| 7,612,999 | B2 * | 11/2009 | Clark | A61B 5/0002 248/918 |
| 7,617,018 | B2 * | 11/2009 | Ford | E02B 17/0836 180/41 |
| 7,621,489 | B2 * | 11/2009 | Cvek | A47B 21/007 248/132 |
| 7,656,652 | B2 * | 2/2010 | Moser | G06F 1/1616 206/457 |
| 7,665,709 | B2 * | 2/2010 | Cvek | A47B 21/007 108/25 |
| 8,079,651 | B2 * | 12/2011 | Cvek | A47B 21/007 312/196 |
| 8,276,447 | B2 * | 10/2012 | Montanari | G01M 1/02 73/462 |
| 8,356,516 | B2 * | 1/2013 | Montanari | G01M 1/02 73/462 |
| 8,448,342 | B2 * | 5/2013 | Nobis | G01B 11/2755 33/203.18 |
| 8,605,415 | B2 * | 12/2013 | Daley, III | G06F 1/163 361/679.03 |
| 8,605,416 | B2 * | 12/2013 | Daley, III | G06F 1/163 361/679.03 |
| 8,695,510 | B2 * | 4/2014 | Johnson | A47B 21/0073 108/50.02 |
| 8,717,747 | B2 * | 5/2014 | Chen | H05K 7/1494 312/223.1 |
| 8,830,666 | B2 * | 9/2014 | Daley, III | A45C 11/00 361/679.03 |
| 8,867,199 | B2 * | 10/2014 | Daley, III | G06F 1/163 361/679.03 |
| 9,019,370 | B2 * | 4/2015 | Shirbabadi | G07F 19/201 348/142 |
| 9,032,789 | B2 * | 5/2015 | Braghiroli | G01M 17/021 73/146 |
| 9,250,151 | B2 * | 2/2016 | Matteucci | G01M 1/225 |
| 9,477,262 | B2 * | 10/2016 | Matsuoka | G06F 1/1616 |
| 9,702,790 | B2 * | 7/2017 | Cavalli | G01M 17/027 |
| 9,841,358 | B2 * | 12/2017 | Amirpour | G01M 17/007 |
| 2002/0026823 | A1 * | 3/2002 | Ruhl | G01M 1/02 73/66 |
| 2002/0101139 | A1 * | 8/2002 | Lee | A47B 21/0073 312/196 |
| 2002/0149706 | A1 * | 10/2002 | Rosen | G06F 1/1601 348/794 |
| 2003/0142294 | A1 * | 7/2003 | Jackson | G01B 5/0025 356/139.09 |
| 2003/0187556 | A1 * | 10/2003 | Suzuki | B60T 17/22 701/31.4 |
| 2004/0165180 | A1 * | 8/2004 | Voeller | B60C 11/24 356/139.09 |
| 2005/0026702 | A1 * | 2/2005 | Cole | G07F 17/32 463/46 |
| 2005/0168926 | A1 * | 8/2005 | Lee | G06F 1/16 361/679.06 |
| 2006/0000955 | A1 * | 1/2006 | Cvek | A47B 21/007 248/161 |
| 2006/0209261 | A1 * | 9/2006 | Tak | B60K 35/00 353/13 |
| 2007/0181755 | A1 * | 8/2007 | Oh | F16M 11/10 248/176.1 |
| 2008/0053223 | A1 * | 3/2008 | Montanari | G01M 1/02 73/462 |
| 2008/0060560 | A1 * | 3/2008 | Chen | A47B 21/0073 108/50.01 |
| 2008/0123268 | A1 * | 5/2008 | Taillefer | F16M 11/22 361/679.01 |
| 2008/0165481 | A1 * | 7/2008 | Kirschner | A47B 81/064 361/679.07 |
| 2009/0103260 | A1 * | 4/2009 | Tomioka | G06F 1/1626 361/679.56 |
| 2009/0147457 | A1 * | 6/2009 | Chen | F16M 11/046 361/679.21 |
| 2009/0195994 | A1 * | 8/2009 | MacDonald | G06F 21/86 361/726 |
| 2009/0264194 | A1 * | 10/2009 | Kompella | A63F 13/08 463/31 |
| 2010/0071464 | A1 * | 3/2010 | Montanari | G01M 1/02 73/462 |
| 2010/0084535 | A1 * | 4/2010 | Cvek | A47B 21/007 248/404 |
| 2010/0084536 | A1 * | 4/2010 | Cvek | A47B 21/007 248/404 |
| 2010/0142137 | A1 * | 6/2010 | Kwak | F16M 11/048 361/679.05 |
| 2011/0138892 | A1 * | 6/2011 | Lucas | G01F 22/00 73/65.01 |
| 2012/0050974 | A1 * | 3/2012 | Chen | G06F 1/183 361/679.21 |
| 2012/0275102 | A1 * | 11/2012 | Daley, III | G06F 1/163 361/679.03 |
| 2013/0025372 | A1 * | 1/2013 | Ye | G01M 1/045 73/629 |
| 2013/0250499 | A1 * | 9/2013 | Tseng | H05K 5/0217 361/679.01 |
| 2014/0043736 | A1 * | 2/2014 | Onda | H05K 5/0217 361/679.01 |
| 2014/0083625 | A1 * | 3/2014 | Sotgiu | B60C 25/01 157/1.17 |
| 2014/0236416 | A1 * | 8/2014 | Amirpour | G07C 5/008 701/29.6 |
| 2014/0311231 | A1 * | 10/2014 | Braghiroli | G01M 1/04 73/146 |
| 2015/0138044 | A1 * | 5/2015 | Rawlinson | G06F 3/1454 345/2.2 |

(56) References Cited

U.S. PATENT DOCUMENTS

| | | | |
|---|---|---|---|
| 2015/0141835 A1* | 5/2015 | Nagase | A61B 8/4405 600/459 |
| 2015/0185106 A1* | 7/2015 | Magnani | G01M 1/02 29/407.01 |
| 2015/0216505 A1* | 8/2015 | Han | A61B 8/4405 600/440 |
| 2016/0231203 A1* | 8/2016 | Braghiroli | G01M 17/027 |
| 2016/0341624 A1* | 11/2016 | Corghi | G01M 1/045 |
| 2017/0315354 A1* | 11/2017 | Park | G02B 27/0149 |
| 2018/0014419 A1* | 1/2018 | Sotgiu | F16M 11/18 |

* cited by examiner

MACHINE BODY FOR A WHEEL SERVICING APPARATUS WITH DISPLAY SUPPORT UNIT

CROSS-REFERENCE TO RELATED APPLICATIONS

This application is related to a corresponding European Patent Application filed on Jul. 5, 2016 in the European Patent Office as European Patent Application No. 3,267,172, which is incorporated by reference in its entirety.

FIELD OF INVENTION

The present invention relates to a machine body for a wheel servicing apparatus, in particular to a machine body for a wheel balancing apparatus wherein the machine body comprises a display support unit supporting a display unit attachable thereto.

BACKGROUND OF THE INVENTION

Vehicle wheels are generally made up of a cylindrical metal rim having, at the axial extremities, annual rim flanges between which a slot-in fitting channel or rim well, respectively for an elastic tyre is defined. The side portions of the elastic tyre, the so-called "beads", are blocked up firmly against the annular rim flanges. Irregularities in the rim and/or tire, e.g. small bumps or protrusions which may occur during manufacture or during driving of a vehicle, may lead to an imbalance of the wheel. To correct for this imbalance, weights made of lead or other material may be fitted at predetermined positions of the wheel and along the rim. In order to determine the exact position for such a correction weight, balancing machines are commonly used which enable measuring of the imbalance during wheel rotation. Based on the measured data a processing unit of the wheel balancing machine can determine the exact position(s) on the rim at which one or more correction weights have to be positioned. It is furthermore known in the art to provide visual interfaces to display control parameters for the balancing apparatus, the measurement results and/or the results retracted therefrom, e.g. the positions where to put the correction weights. In order to start and stop operation as well as to provide certain input parameters the wheel balancing apparatus is usually also provided with an input interface, e.g. start buttons, keyboard, touchpad, etc.

An example for such a balancing apparatus is shown in EP patent application 2 163 874, which shows a wheel balancing apparatus comprising, a visual display as well as a control interface integrated in the casing of the wheel balancing apparatus (cf. FIG. 1 of EP 2 163 874). The disadvantage of this arrangement is that the user may only properly read the information displayed on the visual display when he or she is standing right in front of the machine, looking at the display preferably without inclination. However, when providing correction weights to the rim, the user will most likely have to leave the position right in front of the machine, in that case the viewing angle will no longer be optimal.

From EP patent application 2 163 873 an alternative arrangement for the visual display of a wheel balancing apparatus is known, in which a large separate display is provided on top of the machine (cf. FIG. 1 of EP 2 163 873). Wherein such a display provides a better view even from a slightly inclined viewing position to the user, equipping the machine with an extra display results in extra costs for the production, in a longer and more complicated machine assembly as well as reassembly including a more complicated transport.

It is thus an object of the present invention to overcome the disadvantages of the prior art.

SUMMARY OF THE INVENTION

In order to achieve the identified object, the present invention suggests a machine body for a wheel servicing apparatus according to the independent claim. Further embodiments are disclosed by the dependent claims.

According to a first aspect of the invention there is provided a machine body for a wheel servicing apparatus, in particular wheel balancing apparatus, comprising a casing and a display support unit to support a display unit, in particular a touchscreen unit, being attachable to the display support unit. The display support unit being connectable with a processing unit of the wheel servicing apparatus wherein the display support unit is retractably arranged at the machine body to provide
(i) a first position in which a display front surface of the display unit is visible to the outside, and
(ii) a second position in which a display front surface of the display unit is shielded from the outside such that the display front surface is not visible to the outside.

The machine body may be the wheel servicing apparatus, in particular a wheel balancing apparatus, itself or a subcomponent thereof, for instance a weight tray, the wheel guard, etc., wherein the subcomponents may be removably attached to the wheel servicing apparatus. Whether the machine body is a removable subcomponent of the wheel servicing apparatus, which may be stored and/or be transported separately, or whether the machine body is the entire apparatus, in both cases the second position for the display support unit provides a compact design of the machine body which eases packing, stacking and transportation and provides protection for a display unit attached to the display support unit, in particular scraper protection for the display unit's front surface. Furthermore, the claimed machine body provides the advantage that a single display unit may be attached to several machine bodies, for instance a display unit such—but not limited to—a customary tablet, smartphone or any other common or specifically produced electronic display device preferably with touchscreen functionality, provided with a suitable software to be used with the wheel servicing apparatus could be attached to the display support unit. Each user may use a customised tablet on one or more wheel servicing apparatuses or other machines or devices, respectively, which can be found in a maintenance shop. Furthermore the data may also be stored at the tablet for post processing or reporting while the machine could be used by another user using his or her own tablet as user interface. The display unit may also be permanently fixed or integrally formed with the display support unit.

In an embodiment of the present invention, the casing comprises a recess, wherein in the second position the display support unit is slidably retracted in the recess of the casing. By providing a recess at the machine body the display support unit may be slidably retracted into the recess in the second position such that the machine body in the second position provides a compact and smooth surface structure which eases packing and transport as well as decreases the risk of accidentally damaging the display unit when for instance changing a wheel, etc. The display support unit may either be provided in form of one or more telescope arms, e.g. positioned at a side, for instance the back side of the machine body extendable in an upwards direction. However, any other extension mechanism may be applied. The extension may either be controlled electrically or mechanically. In order to fix and release the display support unit in at least one of the first or second position the machine body and/or the display support unit may provide any suitable fixing and/or release/rejection mechanism, e.g. means for clamping, means for latching, magnetic fixing elements, etc. In order to fix and release the display unit at the display support unit any suitable fixing and/or release/rejection mechanism may be provided, e.g. means for clamping, means for latching, magnetic fixing elements, etc. In case a display unit remains attached to the display support unit when moved into the second position, the usually planar display front surface is preferably facing towards an equally planar surface of the machine body such that the display front surface is protected during non-usage, especially during transport.

In an embodiment of the present invention, the casing comprises a slot, wherein in the second position the display support unit is slidably recessed in the slot of the casing. By providing a slot at the machine body, either at a side surface or on the top or bottom surface, the display support unit may be slidably recessed into the slot in the second position such that the machine body in the second position provides a compact and smooth surface structure which eases packing and transport as well as decreases the risk of accidentally damaging the display unit when for instance changing a wheel, etc. Again the display support unit may either be provided in form of one or more telescope arms provided inside the slot extendable in the expansion direction. However, any other extension mechanism may be applied. The extension may either be controlled electrically or mechanically. For instance, much like the spring supported latching mechanisms commonly used for storage cards inserted in a laptop or other electronic device, a rejection from a recessed position can be achieved by further pushing the display support unit into the slot, thereby overcoming the locking mechanism wherein pre-tensioned springs may then extend the display support unit into the first position. Another example would be an electrically driven mechanism controllable via an eject/retract button. In order to fix and release the display support unit in at least one of the first or second position, the machine body and/or the display support unit may provide any suitable fixing and/or release/rejection mechanism, e.g. means for clamping, means for latching, magnetic fixing elements, etc.

In an embodiment of the present invention, the display support unit is folded in the second position such that the display front surface of the display unit attachable to the display support unit is in contact with a section of the outer wall of the casing. Unlike an embodiment in which the display support unit is slidably arranged at the machine body, the second position may also be achieved by folding the display support unit such that the display support unit is positioned at an outer wall, preferable in a recess portion of the outer wall, wherein, in case the display unit is attached to the display support unit, the usually planar display front surface is preferably facing towards a planar portion of the outer wall of the casing. The foldable display support unit may be attached via one or more hinges directly to the machine body: Alternatively, the display support unit may be provided as a moving arm having a display support frame at the end. The arm may be provided with one or more hinges to enable a flexible positioning and orientation of the display unit attached to the display support frame. Depending on the number of hinges, the display unit may even achieve a spherical orientation as well as a positioning range defined by: the length of the arm.

In a further embodiment of the present invention the display support unit comprises connection plugs for the display unit for connecting the display unit with the processing unit and/or a power unit. The display support unit may provide a kind of click station in which a display unit may be plugged in. Depending on the way the display unit exchanges data with the processing unit of the wheel servicing apparatus, e.g. hard wired or wireless, the display support unit may provide one or more plugs connectable with respective sockets of the display unit via which the display unit may receive power and/or data from the wheel servicing apparatus. Accordingly, the respective cables or transport channels have to be provided along the extendable display support unit structures. The display support unit may provide a frame, e.g. L-shaped or closed, into which the display unit fits in. Alternatively, the display support unit may only provide a guide rail into which the display unit can be positioned.

In an embodiment of the present invention, the display support frame only comprises power plugs or is adapted to provide only mechanical support for the display unit. In case the display unit to be attached to the display unit support frame is wirelessly connectable to the processing unit of the wheel servicing apparatus, e.g. via Bluetooth, WLAN or the like, and may run on battery like a tablet, no further plugs are required. The cables for connecting the display support unit with the wheel servicing apparatus may be reduced to a minimum, e.g. power supply only. In case the display unit runs on battery or may also be charged in a wireless fashion, for instance in an inductive manner, no cables are required to connect the display unit with the processing unit of the wheel servicing apparatus which reduces the complexity of the device resulting in lower costs regarding material and construction time. Furthermore, any movement of the display support unit is no longer restricted by the available length or play of a cable.

In a further embodiment of the present invention, the display support unit in the first position is inclinable and/or movable in an upward, downward, left or right direction. In case the user of the wheel servicing apparatus is working at a certain distance and/or with a certain inclination to the machine body, the display support unit may be flexibly positioned such that the user may look at the display front surface of the display unit attached to the display support unit without inclination.

In an embodiment of the present invention, the display support unit comprises a display support frame adaptable to a size of the display unit. The frame may have any suitable form, such as a rectangular frame, an L-shaped frame, etc. Providing a frame adaptable in size is in particular advantageous when varying display devises may be attached to the display support unit, e.g. customised tablets may vary in size. Alternatively, the display support unit may comprise a retaining ledge into which the display unit is positionable. The retaining ledge may also support different display unit sizes.

In another embodiment of the present invention, the machine body further comprises a locking mechanism to fix the display support unit in at least one of the first and second position. In order to stabilise the display support unit in either one of the first or the second position a locking mechanism is provided, which protects the display support unit from unwanted position changes, for instance during transport where the display support unit should preferably remain in the second position or during operation where unintentional movement of the display support unit can be avoided by fixing the display support unit in the first position.

In an embodiment of the present invention, the machine body further comprises control means to automatically adapt the position of the display support unit, preferably in dependence of an observed user position. During operation of the wheel servicing apparatus the user might change his position for instance when providing weights to the rim. In order to maintain an optimal view onto a display unit attachable to the display support unit, it is desirable to have control means which automatically adapt the position of the display support unit. The input data required to adapt the orientation of the display support unit to the user's position may be obtained from visual data captured with the camera, either externally provided or integrated in the display unit. For instance, the display unit may provide the camera and a control program detects the users viewing angle and adapt the position of the display support unit accordingly. Additional features known from gaze tracking applications may be used in addition to zoom, scroll or other display change operations. Alternatively or in addition, the display support unit may be controlled to engage in a specific position depending on a processing operation performed with the wheel servicing apparatus.

Alternatively or in addition, the control means could be activated via processing of verbal commands. In that case the microphone, either provided externally or integrated in the display unit may deliver the input data.

In an embodiment of the present invention the machine body further comprises an actuator unit configured to bring the display support unit into the first position upon activation of the wheel servicing apparatus and/or configured to bring the display support unit into the second position upon shut down of the wheel servicing apparatus. The actuator, for instance a servo motor may expand or retract the display support unit upon activation in order to shorten the time until the wheel servicing apparatus is ready for operation. In order to assure that the wheel servicing apparatus remains in the second position when it is not used, the servo motor may automatically bring the display support unit into the second position, thus releasing the user from the duty to assure the wheel servicing apparatus remains in the more secure second position.

In an embodiment of the present invention the machine body further comprises a display unit permanently fixed to the display support unit. Wherein the above embodiments have been described with reference to a reversibly attachable display unit, all of the above embodiments may also be provided with a display unit permanently fixed to the display support unit. Integral a fixed display units may provide the advantage of a more robust connection as well as a smaller risk of signs of wear.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION

Figure 1A:
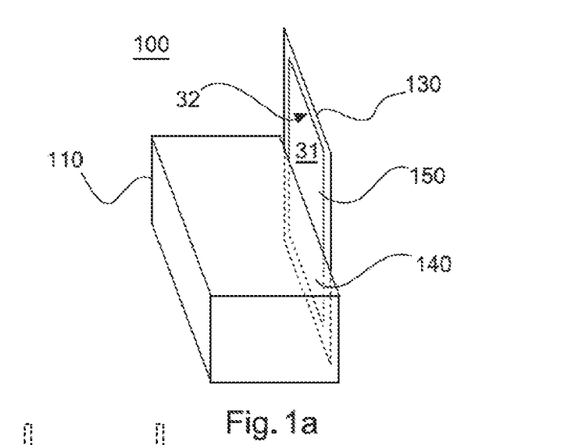
FIGS. 1a-d show schematic drawings of machine bodies having a slidable display support unit.
Figure 1B:
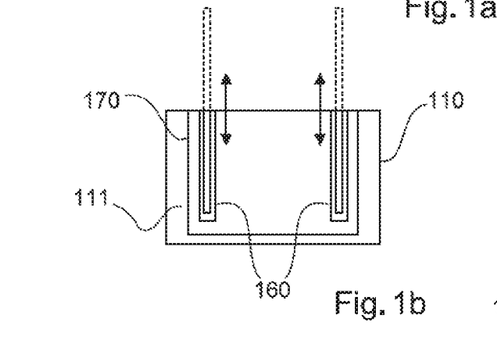
Figure 1C:
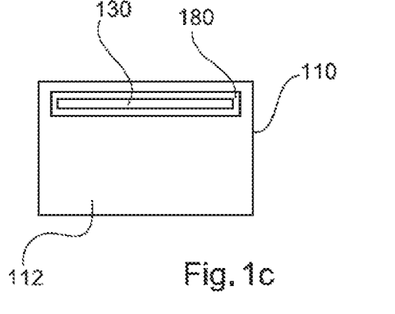
Figure 1D:
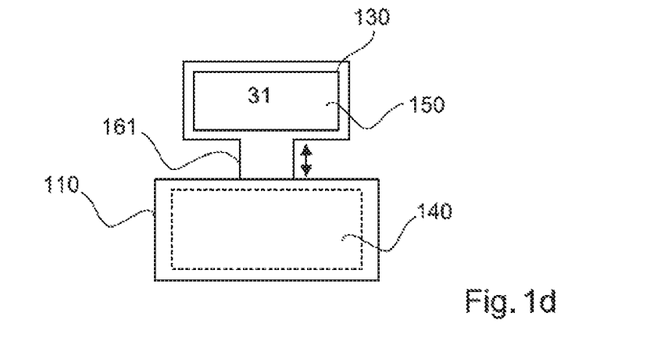

FIG. 1a shows a schematic drawing of a machine body 100 according to an embodiment 100 of the present invention. In a first position 150 of a display support unit 130, in which the display support unit 130 is in an upright position, a display unit 31 is removably attached to the display support unit 130 wherein a display front surface 32 of the display unit 31 is visible to the outside, e.g. the user. In a second position 140 the display support unit 130 is in a retracted position. The display front surface 32 of the display unit 31 is shielded from the outside such that the display front surface 32 is not visible to the user. As schematically depicted in FIG. 1b the retracted position 140 may be achieved by sliding the display support unit 130 along vertically arranged guide rails 160 from the upright position 150 downwardly. Optionally, the machine body 100 provides a recess portion 170, for instance on the backside 111 of the casing 110 of the machine body 100, such that in the second position 140 the machine body 100 provides a compact design substantially without protrusions or recesses at the outer surface. Alternatively, the display support unit 130 may be recessed into a slot 180 provided inside the casing of the machine body 100, for instance at the top surface 112 as schematically illustrated in FIG. 1c. Again, the display support unit 130 may be slidably moved from the first position 150 to the second position 140 and vice versa along guide rails 160 or any other suitable telescopic devise or expansion mechanism. In FIG. 1d, a schematic drawing of a further embodiment is shown in which the display support unit 130 is provided at a preferably central slidable arm 161. However, any other position is also feasible. Such an embodiment provides the advantage that the display support unit on top of the central slidable arm 161 may be adapted to be rotatable around the axis of the arm to provide inclinations to the left and right side. As for the other embodiments the display support unit 130 may be slidably moved from the first position 150 to the second position 140 and vice versa along guide rails or any other suitable telescopic devise or expansion mechanism.

The expansion mechanism may generally be started automatically when starting the wheel servicing apparatus and revert to the retracted position 140 upon shut down/power down of the wheel servicing apparatus, e.g. via a servo motor or any other suitable actuator.

Figure 2A:
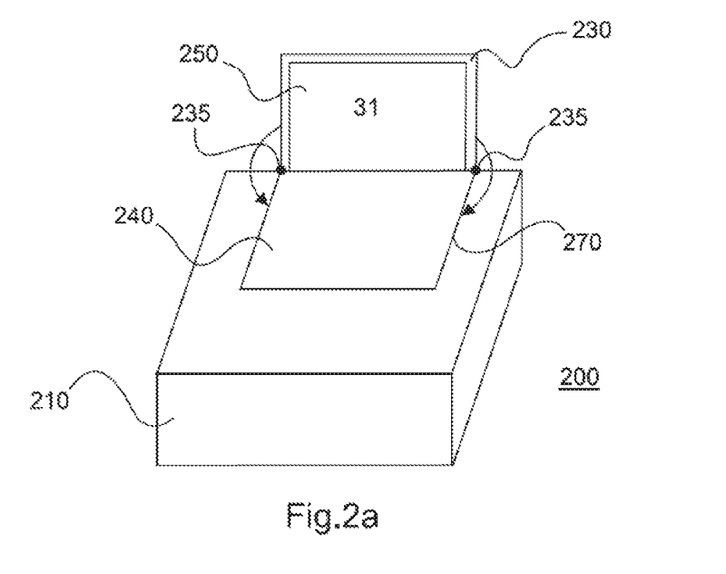
FIGS. 2a and 2b show schematic drawings of machine bodies having a foldable display support unit.
Figure 2B:
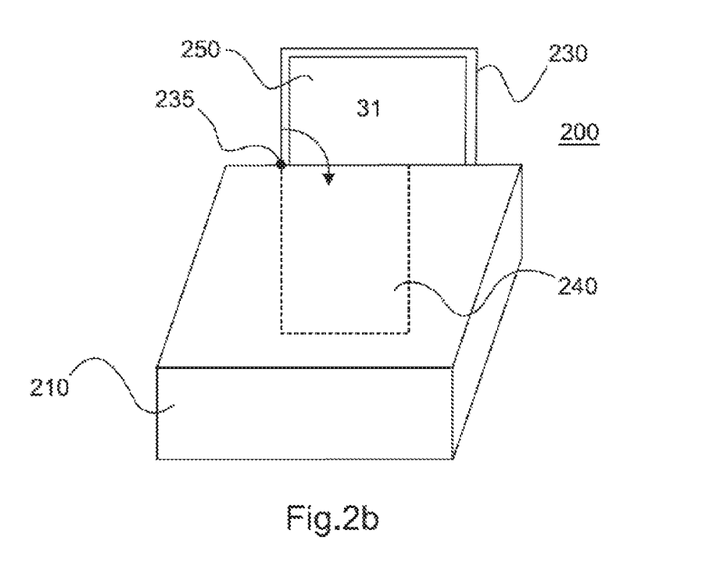
Figure 3:
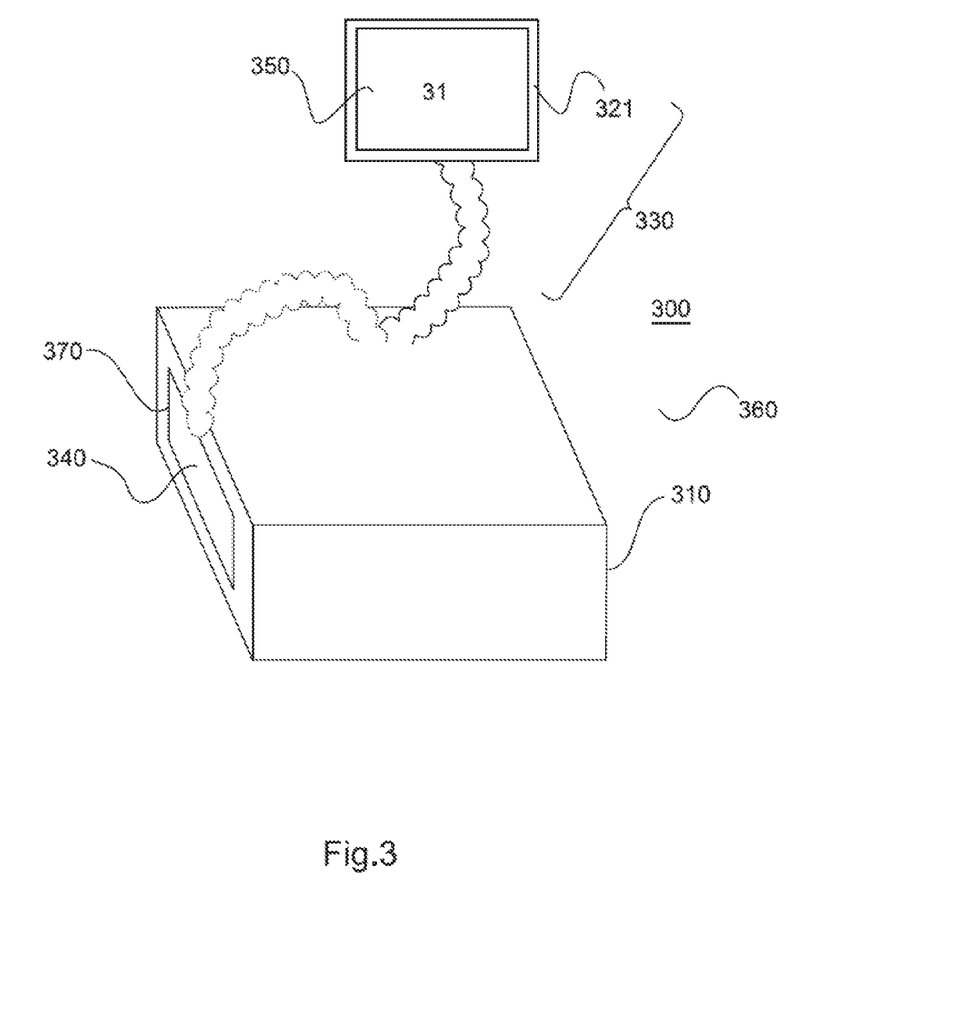
FIG. 3 shows a schematic drawing of a machine body having a display support frame provided at the end of a movable support arm.

FIG. 2a shows a schematic drawing of a machine body 200 according to an alternative embodiment of the present invention. Only the differences with respect to the embodiments of FIG. 1a-d shall be described. Instead of being slidably moved from the first to the second position the display support unit 230 in this alternative embodiment may be folded from a first, for instance, an upright position 250 to a second, closed position 240. Again, the machine body 200 may optionally comprise a recess portion 270 such that the machine body 200 shows a plane surface when the display support unit 230 is folded into the second position 240. Wherein FIG. 2a exemplary shows a folding from an upright position along the axis provided by the lower edge of the rectangular display support unit 230, any other folding direction/axis would be feasible, depending on the position of hinges 235 provided by the display support unit 230. The person skilled in the art will furthermore appreciate that the folded position 240 and optimally the recess portion 290 may be provided at any surface position (left side, right side, front and backside, etc) of the casing 210. Instead of folding the display support unit 230 along an edge side of the display support unit 230, FIG. 2b shows that alternatively or in addition, the display support unit 230 may also be rotatably folded away, wherein the display support unit 230 is rotated by 90° around the rotation axis provided by hinge 235. The folding may be achieved by manually folding the display support unit by a user or by electrically controlling the mechanism. In the latter case, the folding mechanism may generally be started automatically when starting the wheel servicing apparatus and revert to the retracted position 240 upon shut down/power down of the wheel servicing apparatus. In order to fix the display support unit 230 in any of the first 250 or second 240 position or any position in between any suitable attachment means may be used, e.g. means for clamping, latching or magnetically fixing. FIG. 3 shows a schematic drawing of yet another machine body 300 according to an alternative embodiment of the present invention. The display support unit 330 comprises an arm structure 360 which may be provided with one or more hinges and a display support frame 321 at the end. The arm allowing at least a movement from a retracted position 340, for which optionally a recess portion 390 or slot may be provided at any suitable position of the machine body 300 to an open position 250. Depending on the flexibility of the arm structure 360, the display support unit 330 may provide for any spherical orientation. Depending on the length of the arm structure 360 the display support unit 330 may be positioned in a respective area above the machine body 300 which may exceed beyond the machine body's dimensions. The arm structure 360 may be mechanically or electrically controllable/movable from one position to another.

The display unit 31 attachable to the display support unit 330 may further provide a camera and a control program which detects the users viewing angle. In case the display support unit 330 allows an inclination in first position 350, e.g. in FIG. 1d, FIG. 2b, FIG. 3, the display support unit 330 may adapt the position of the display support unit 330 accordingly. In that case the display support unit 330 has to provide a communication interface between the display unit 31 and control electronics controlling the movements of the display support unit 330. Additional features known from gaze tracking applications may be used in addition to zoom, scroll or other display change operations. Alternatively or in addition, the display support unit 330 may be controlled to engage in a specific position depending on a processing operation currently performed by the wheel servicing apparatus. For instance, if respective positions for one or more correction weights have been determined by the wheel balancing machine, the display support unit may be positioned, for example by an electric motor or the like, such that a user can see the display while providing the correction weights to the rim of the wheel.

Figure 4A:
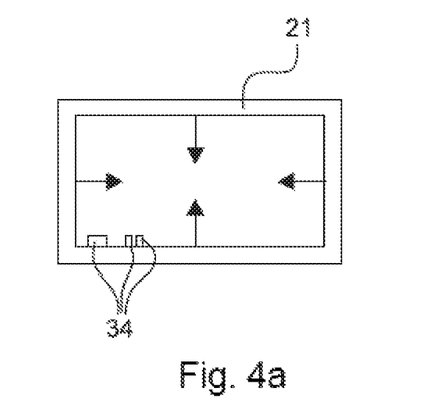
FIGS. 4a-c show schematic drawings of different embodiments of the display support unit structure into which a display unit may be attached.
Figure 4B:
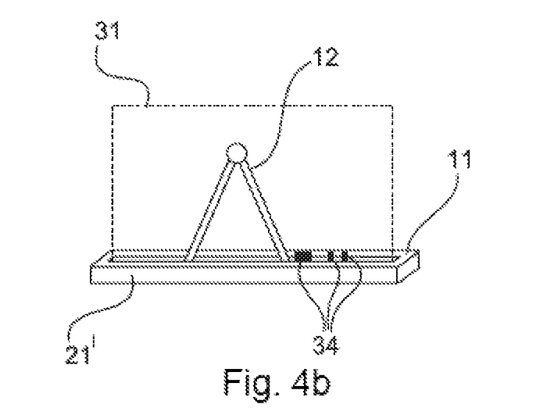
Figure 4C:
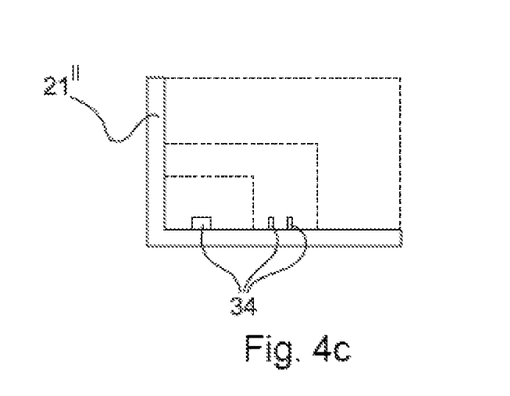

FIGS. 4a-c show schematic drawings of different embodiments of display unit support structures 21, 21', 21" which may be used with any of the above-mentioned embodiments 100, 200 and 300 of the invention. FIG. 4a schematically shows a rectangular frame 21 which may have a fixed size, for instance fitted to a standard display unit size. However, more preferably the frame size is adaptable to a plurality of frame sizes in order to support different display units having different frame sizes. Furthermore, an adaptable frame structure would ease the attachment procedure of the display unit 31 to the display unit support frame 21. In order to fix the display unit 31 within the display unit support frame 21 any suitable attachment means may be used, e.g. means for clamping, latching or magnetically fixing. At one or more of the frame sides one or more plugs 34 may be provided, preferably in a recess portion 11 of bottom frame side, to provide power and/or data communication ports to the display unit 31.

In an alternative variant for the display unit support structure a retaining ledge 21' may be provided in which the display unit 31 may be inserted as schematically indicated in FIG. 4b. Optionally, the retaining ledge 21' provides one or more support arms 12, preferably in effectively orthogonal direction to the retaining ledge 21' in order to stabilise the display unit 31 which is in particular relevant in case the display unit 31 provides touchscreen functionality and thus is exposed to pressure on the display front surface 32. Wherein the embodiment shown in FIG. 4b does not provide any limitations in size for the display unit 31 in a vertical direction, the horizontal dimensions of the display unit 31 may be limited to the length of the retaining ledge 21' in case the ends of the retaining ledge 21' are closed. Otherwise the display unit 31 may further extend in horizontal direction. Again the retaining ledge 21' may provide one or more plugs 34, preferably in a recess portion 11 of the retaining ledge 21' to provide power and/or data communication ports to the display unit 31.

A further alternative variant for the display support structure is shown in FIG. 4c which illustrates an L-frame 21" having one vertical leg and one horizontal leg to support a display unit 31. The advantage of an L-frame compared to an entire frame 21 as depicted in FIG. 4a is that the L-frame 21" naturally supports variable sized display units 31. However, with only two support legs the stability of the display unit 31 inside the L-frame 21" is decreased with respect to the rectangular frame 21 shown in FIG. 4a. As for the display support unit structure 21' depicted in FIG. 4b, optional support arms 12 may be provided for both frames structures 21 and 21" shown in FIG. 4a as well as FIG. 4c, respectively, in order to increase stability, in particular to support a touchscreen display unit when pressure is provided to the display front surface 32, e.g. when a user touches the display unit 31 to enter a control command. Again the L-frame 21" may provide one or more plugs 34, preferably in a recess portion of one of the legs to provide power and/or data communication ports to the display unit 31. In order to fix and release the display unit at the display support unit any suitable fixing and/or release/rejection mechanism may be provided, e.g. means for clamping, means for latching, magnetic fixing elements, etc.

Figure 5:
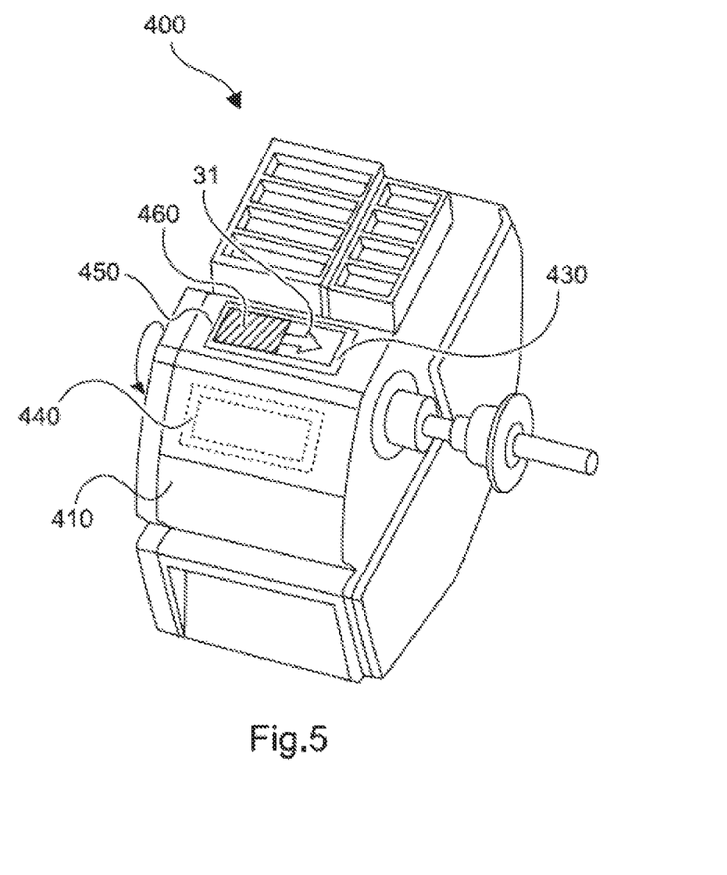
FIG. 5 shows a schematic drawing of a further embodiment showing a machine body having an integrated display support unit with a slidable cover.

In a further embodiment of the present invention, the display support unit 430 is integrally formed with a part of the casing 410 of the machine body 400 as indicated in FIG. 5. A display unit 31 may be attachable to the display support unit 430, e.g. a tablet may be inserted, wherein the respective pins for data and power connections may be provided by the display support unit 430 in a click station like fashion.

Alternatively, the display unit may be permanently fixed to the display support unit 430. In a first position 450, the display surface of a display unit 31 attached to the display support structure 430 is visible to a user such that the user may view the displayed information and/or enter commands if the display provides touchscreen functionality. In a second position 440, the part of the machine body 400 comprising the display support unit 430 may be slidably recessed behind a front cover or the part of the machine body as a whole may be rotated such that the display support unit 430 is directed to the inside of the machine body. Alternatively, the display support unit 430 may comprise a cover 460 which extends across the display support unit 430, preferably in an automated fashion whenever the display unit 31 is not needed for operation. A display unit 31 attachable to the display support structure 430 may remain attached to the display support structure 430 when the display support structure 430 is covered by the cover 460. In that case, the cover 460 provides protection for the display support surface against scratches and the like. In case the display unit 31 has been removed, the cover protects the recess portion 11 formed by the integrally formed display support unit 430 from dust or other components that may accumulate in the recess portion 11.

Figure 6:
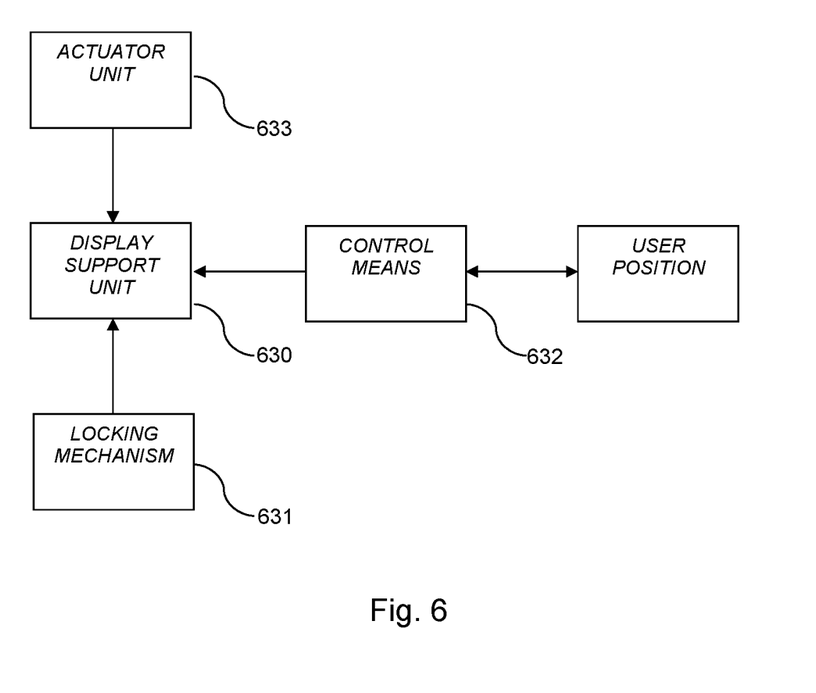
FIG. 6 shows a schematic drawing illustrating interaction of a display support unit with locking means, an actuator unit and control means according to an embodiment of a machine body for a wheel servicing machine.

FIG. 6 shows a schematic drawing illustrating interaction of a display support unit 630 with locking means 631 to fix the display support unit 630 in at least one of the first and second positions, an actuator unit 633 configured to bring the display support unit 630 into the first position upon activation of the wheel servicing apparatus and into the second position upon shut down of the wheel servicing apparatus and control means 632 to automatically adapt the position of the display support unit 630 in dependence of an observed user position, according to an embodiment of a machine body for a wheel servicing machine.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

REFERENCE SIGNS LIST

100, 200, 300, 400 machine body
110, 210, 310, 410 casing
130, 230, 330, 430 display support unit
150, 250, 350, 450 first position
140, 240, 340, 440 second position
11 recess portion (frame structure)
170, 270, 370 recess portion
12 support arms
21 rectangular frame (display unit support structures)
21' retaining ledge (display unit support structures)
21" L-frame (display unit support structures)
31 display unit
32 front surface
34 plugs
111 backside
112 surface
160 guide rails
161 central slideable arm
180 slot
235 hinges
321 display support frame
360 arm structure
630 display support unit
631 locking means
632 control means
633 actuator unit

The invention claimed is:

1. A machine body for a wheel servicing apparatus comprising:
   a casing; and
   a display support unit configured to support a display unit attachable to the display support unit and connectable with a processing unit of the wheel servicing apparatus,
   wherein the display support unit is movably arranged at the casing to provide
   (i) a first position in which a display front surface of the display unit is visible to a user, and
   (ii) a second position in which the display front surface of the display unit is shielded from the outside such that the display front surface is not visible to the user, wherein the casing comprises a recess portion and wherein in the second position the display support unit is slidably retracted in the recess portion of the casing, or
   wherein the casing comprises a slot and wherein in the second position the display support unit is slidably recessed in the slot of the casing.

2. The machine body according to claim 1, wherein the casing comprises the recess portion and the display front surface is slidably retracted in and out of the recess portion when the display support unit is moved between the first position and the second position.

3. The machine body according to claim 1, wherein the casing comprises the slot and the display front surface is slidably recessed in and out of the slot when the display support unit is moved between the first position and the second position.

4. The machine body according to claim 1, wherein in the second position the display support unit can be transferred from the first to the second position via folding.

5. The machine body according to claim 1, wherein the display support unit comprises connection plugs for the display unit for connecting the display unit with the processing unit.

6. The machine body according to claim 1, wherein the display support unit only comprises power plugs or is adapted to provide only mechanical support for the display unit.

7. The machine body according to claim 1, wherein the display support unit in the first position is inclinable in an upward, downward, left or right direction.

8. The machine body according to claim 1, wherein the machine body is a weight tray removably attachable to the wheel servicing apparatus.

9. The machine body according to claim 1, wherein the display support unit in the first position is adapted to be flexibly aligned to a user's point of view.

10. The machine body according to claim 1, wherein the display support unit comprises a display support frame adaptable to a size of the display unit.

11. The machine body according to claim 1, wherein the display support unit comprises a retaining ledge into which the display unit is positionable.

12. The machine body according to claim 1, further comprising a locking mechanism to fix the display support unit in at least one of the first and second positions.

13. The machine body according to claim 1, further comprising control means to automatically adapt the position of the display support unit, preferably in dependence of an observed user position.

14. The machine body according to claim 1, further comprising an actuator unit configured to bring the display support unit into the first position upon activation of the wheel servicing apparatus.

15. The machine body according to claim 1, further comprising a display unit permanently fixed to the display support unit.

16. The machine body according to claim 1, wherein the display support unit comprises connection plugs for the display unit for connecting the display unit with a power unit.

17. The machine body according to claim 1, further comprising an actuator unit configured to bring the display support unit into the second position upon shut down of the wheel servicing apparatus.

* * * * *